Patented Feb. 23, 1943

2,312,229

UNITED STATES PATENT OFFICE 2,312,229

METHOD OF FORMING FLUORESCENT SCREENS

James Thomson Anderson, Rugby, England, assignor to General Electric Company, a corporation of New York No Drawing. Application November 27, 1940, Serial No. 367,471. In Great Britain April 12, 1940

4 Claims. (Cl. 250—81)

My invention relates to processes and materials for coating vitreous surfaces with fluorescent materials and more particularly to electric discharge devices whose interior surfaces are so coated.

The production of an adherent layer of fluorescent material on a carrier body, as for example glass, to form the fluorescent screen used in cathode ray tubes, lamp bulbs or like devices, is usually effected by means of a binder which is either applied previously to the carrier body or else as a mixture with the fluorescent material.

Heretofore, it has generally been the practice to suspend the fluorescent material in a solution of nitrocellulose as the binder. In this case the fluorescent material is mixed (usually ball milled) with a solution of nitrocellulose in a solvent of suitable viscosity, such as amyl acetate. When the surface to be coated is the interior surface of a glass tube, the powdered nitrocellulose mixture is either drawn up the tube and allowed to recede or is poured down the tube which is suitably rotated to obtain an evenly coated surface. Other surfaces can be coated by obvious modifications of this procedure. After drying, the tube is baked in an oxidizing atmosphere to remove the nitrocellulose and its decomposition products, whereupon a coating of powder alone is left in the tube.

This procedure has not been entirely satisfactory in the past. It has been necessary to observe many precautions in order to insure that during the dispersal of most of the nitrocellulose, part of it is not charred and a dark deposit thereby left which would reduce the efficiency of the coating. An object of my invention is to provide a substitute for nitrocellulose in the above described process which substitute is less subject to this disadvantage. According to my invention, I employ as a binder for causing the adherence of a powdered material, as the fluorescent powder, to a carrier body a solution of a polystyrene in a solvent which preferably will leave no harmful residue when the binder is volatilized.

Further objects and advantages of my invention will be apparent from the following detailed description.

Polystyrene is a substance which in addition to giving a suitably viscous solution to hold a powder in suspension and give good coating speeds, can be completely eliminated by volatilization with or without dipolymerization or fusion at temperatures which do not materially affect the process or the coating powder—usually those below the range 450° C. to 500° C.—and which preferably contains no oxygen or other element likely to give rise to dipolymerization or decomposition products which might adversely affect the condition or life of the coating powder.

The polystyrene may be obtained as powder granules, sticks etc. and in varying degrees of polymerization and may be used as such, but we prefer to use the granules sold under the trade name Distrene as Distrene "80" or Distrene "120."

The solvent used may be any in which the polystyrene is soluble and which does not adversely affect the fluorescent material during the preparation of the mixture or during evaporation but we prefer to use xylene, isopropylbenzene, ethyl or amyl acetate (or a mixture thereof) and we also prefer to add a small amount of plasticizer to prevent falling of the dried mixture from the carrier body before or during the firing process. The plasticizer also should volatilize without residue and with ease. We prefer to use diphenyl, amylnaphthalene or camphor for this purpose.

The baking process to eliminate the binder may usefully be carried out in a non-oxidizing atmosphere though this may be dispensed with where the use of an oxidizing atmosphere (such as ordinary air) is not harmful to the fluorescent materials used. The fluorescent materials used may be finely divided crystalline fluorescent sulphides such as those of zinc, cadmium or manganese with or without activators, or those commonly used in fluorescent discharge lamps such as zinc silicate, zinc beryllium silicate, magnesium tungstate, cadmium phosphate, cadmium silicate, cadmium tungstate, zinc phosphate, calcium tungstate, cadmium borate with, where necessary, the additional compounds or activators added to secure their fluorescent properties.

By using, for simplicity, the term fluorescent materials I do not wish to limit myself to compounds which are only fluorescent or to exclude those which are more or less phosphorescent. Moreover, I may also use my process for the application of colored or white non-fluorescent substances e. g., magnesium oxide, or barium carbonate.

In an example of my process I may dissolve 30 gm. of Distrene "80" in 100 cc. of a mixture of 30 cc. xylene and 70 cc. amyl acetate, add 5 gm. of diphenyl and dissolve. Next, 30 gm. of fluorescent material (70 gm. of zinc beryllium silicate and 30 gm. of magnesium tungstate) may be ball milled for 24 hours (at 70 R. P. M.) with 30 cc.

of the above mentioned mixed solvent. After the 24 hours rolling, 100 cc. of Distrene solution prepared as described may be added and the whole ball milled again for 30 minutes. The preparation is then ready for applying to lamp production by pouring down the inclined rotating tubes.

After draining—with or without inversion of the tubes during this process—the tubes may be gradually heated to the desired temperature with a current of gas passing through them.

The process of my invention may be used with any lamps of the type commonly used in the art of fluorescent lighting. For example, it may be of the type described in the United States Patent No. 2,182,732—Meyer et al. and may contain activated cathodes and, in addition to the usual filling of an ignition gas, a small amount of mercury or other vapor at pressures of the order of from 1 to 20 microns. The ignition gas is preferably one of the rare gases commonly used and may have a pressure of the order of several microns to several centimeters.

What I claim as new and desire to secure by Letters Patent of the United States is:

1. The process for coating the interior surface of a vitreous lamp envelope with powdered fluorescent material which includes the steps of coating said surface with a suspension of the fluorescent material in a solution of a polymerized styrene and thereafter heating said coating so formed to a temperature at which said polymerized styrene is dispersed and completely eliminated.

2. The process for coating the interior surface of a vitreous lamp envelope with powdered fluorescent material which includes the steps of coating said surface with a suspension of fluorescent material in a solution of a polymerized styrene in a solvent or solvents taken from the group consisting of xylene, isopropyl-benzene, ethyl acetate and amyl acetate and thereafter heating said coating so formed to a temperature at which said polymerized styrene is dispersed and completely eliminated.

3. The process of coating the interior surface of a vitreous lamp envelope with powdered fluorescent material which includes the steps of coating said surface with a suspension of the fluorescent material in a solution of a polymerized styrene and a plasticizer and thereafter heating said coating so formed to a temperature at which said plasticizer and said polymerized styrene are dispersed and completely eliminated.

4. The process of coating the interior surface of a vitreous lamp envelope as claimed in claim 3 wherein the plasticizer is taken from the group consisting of diphenyl, amylnaphthalene and camphor.

JAMES THOMSON ANDERSON.